United States Patent [19]
Nakamura et al.

[11] Patent Number: 5,260,570
[45] Date of Patent: Nov. 9, 1993

[54] LASER BEAM SCANNING SYSTEM UTILIZED IN AN IMAGE FORMING APPARATUS

[75] Inventors: Hiromu Nakamura, Toyokawa; Masanori Mirakami, Toyohashi, both of Japan

[73] Assignee: Minolta Camera Kabushiki Kaisha, Osaka, Japan

[21] Appl. No.: 875,982

[22] Filed: Apr. 29, 1992

[30] Foreign Application Priority Data

Apr. 30, 1991 [JP] Japan ................... 3-097817

[51] Int. Cl.⁵ ............................ H01J 3/14
[52] U.S. Cl. ........................ 250/235; 358/481
[58] Field of Search ........... 250/235, 236, 568; 358/63, 481, 494; 359/17, 214

[56] References Cited

U.S. PATENT DOCUMENTS

| | | | |
|---|---|---|---|
| 4,034,230 | 7/1977 | Brill et al. | 250/568 |
| 4,888,647 | 12/1989 | Wada | 358/474 |
| 5,075,538 | 12/1991 | Swartz et al. | 235/467 |

FOREIGN PATENT DOCUMENTS 63-38272 8/1986 Japan.
378722 8/1989 Japan.

OTHER PUBLICATIONS

IEEE Photonics Technology Letters, vol. 1, No. 11, Nov. 1989, pp. 354-355.

*Primary Examiner*—David C. Nelms
*Assistant Examiner*—T. Davenport
*Attorney, Agent, or Firm*—Price, Gess & Ubell

[57] ABSTRACT

A novel laser beam scanning system which stores fundamental components in an optical unit by way of including a laser light source, a photosensor for detecting image-writing starting point per scanning, a lens for focusing a laser beam from the laser light source, and a lens for condensing a laser beam reflected by a polygon mirror on the photosensor. The laser beam reflected by the polygon mirror sequentially scans the photosensor, the laser light source, and a recording medium. When the laser beam reflected by the polygon mirror scans the laser light source, the laser light source ceases light-emitting operation. Furthermore, the laser beam reflected by the polygon mirror is condensed on an edge of a photoreceptive surface of the photosensor.

29 Claims, 9 Drawing Sheets

LASER BEAM SCANNING SYSTEM UTILIZED IN AN IMAGE FORMING APPARATUS

BACKGROUND OF THE INVENTION

1. Field of the Invention

This invention relates to a laser beam scanning system. More particularly, the invention relates to such a laser beam scanning system which is available for an image writing head for use with image-forming apparatuses like an electrophotographic copying machine, a laser printer, or a facsimile, or the like.

2. Description of Related Art

Generally, any conventional laser beam scanning optical system built in an image-forming apparatus like a laser printer or a facsimile causes a deflecting unit (a polygon mirror) to deflect and scan a laser beam emitted from a laser light source (a laser diode) on a plane at equal angular velocity, and then corrects image-scanning velocity by applying an fθ lens or an fθ mirror before forming an image on a scanning line (a photosensitive object). Next, in order to detect image-writing starting point per scanning process, the scanning starting part of the laser beam deflected by the deflecting unit is irradiated to a photosensor (an SOS sensor).

Conventionally, such a photosensor is housed in a package independent of a laser diode and dealt as a discretely provided component element. Practically, the driving circuit board for the laser diode and the signal detecting circuit board for the photosensor are connected to each other via a wiring harness. Nevertheless, this conventional structure raises critical problem by causing unwanted noise to easily infiltrate into the harness from external sources.

On the other hand, a laser beam scanning optical system disclosed in the U.S. Pat. No. 4,888,647 is so structured that the laser beam reflected by a polygon mirror returns in the direction of the laser diode. This optical system arranges a photo-volume monitoring photodiode provided on the back of the laser diode to simultaneously function as an SOS sensor. Nevertheless, it is difficult for this laser beam scanning optical system to fully focus the laser beam reflected by the polygon mirror on the photo-volume monitoring photodiode. Furthermore, it is not always a desirable practice to have the laser beam irradiate the laser diode.

SUMMARY OF THE INVENTION

An object of the invention is to fully solve those technical problems cited above by providing a novel laser beam scanning system which is characterized by provision of a decreased number of component parts and easy production method based on a less number of assembly processes.

Another object of the invention is to provide a novel laser beam scanning system which is capable of securely detecting an SOS signal by preventing the laser beam reflected by a deflecting unit from being incident on the laser light source even when the laser beam is incident on a photosensor (an SOS sensor).

A still further object of the invention is to provide a novel laser beam scanning system which is free from adversely being affected by external noise and yet capable of securely maintaining satisfactory rise characteristic of detect signal output from an SOS sensor.

A laser beam scanning system according to one aspect of the invention includes a laser light source for emitting a laser beam and a photosensor for receiving the laser beam, which are adjacent to each other. The laser light source and the photosensor may be housed in a complete package. On the front face of the package, a first lens for converging the laser beam emitted from the laser light source and a second lens for converging the laser beam to be incident on the photosensor may be provided.

The above and further objects and features of the invention will more fully be apparent from the following detailed description with accompanying drawings.

DESCRIPTION OF THE PREFERRED EMBODIMENTS

Referring now to the accompanying drawings, the detail of the laser beam scanning system according to an embodiment of the invention is described below.

The First Embodiment

Figure 1:
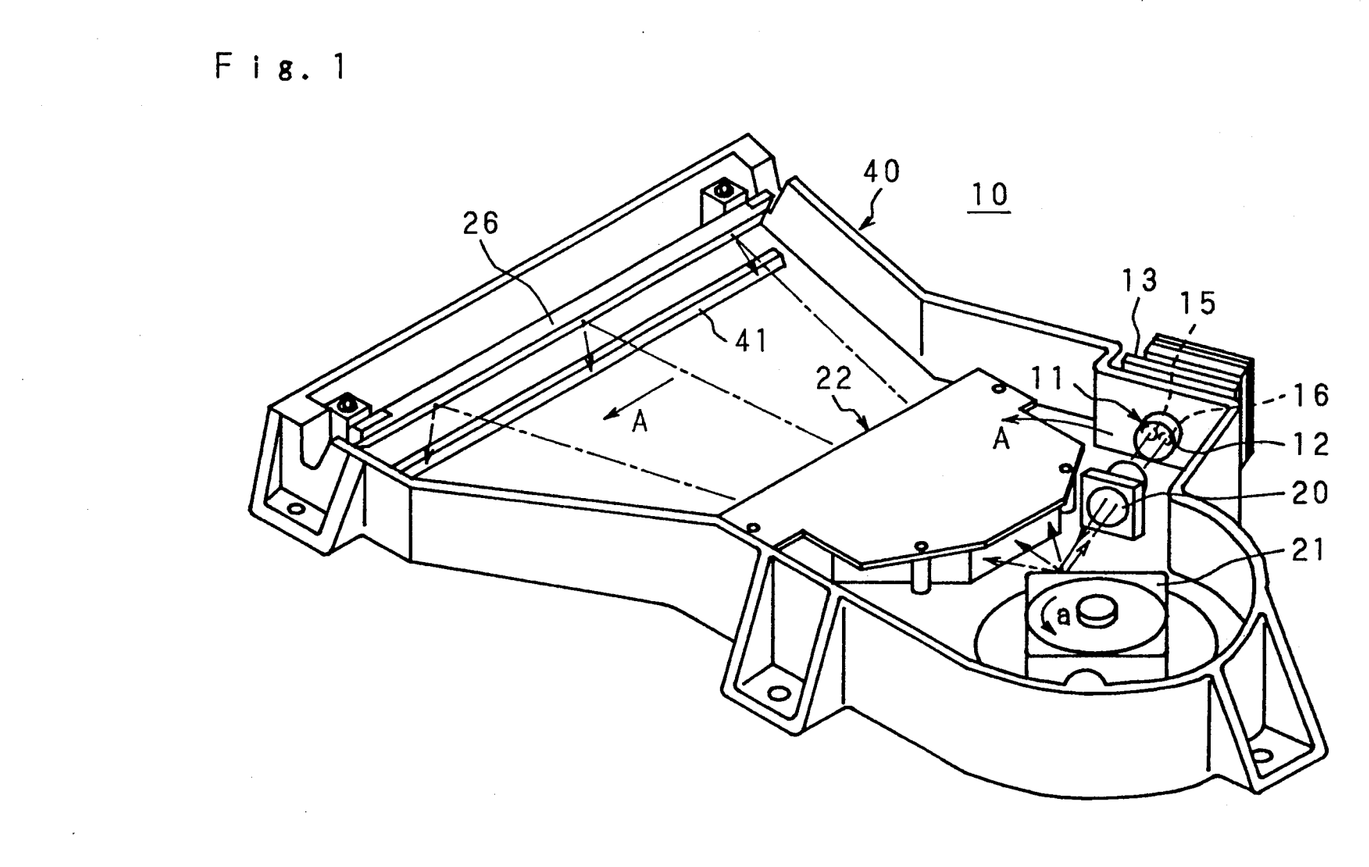
FIG. 1 is an overall perspective view of the laser beam scanning system according to an embodiment of the invention.
Figure 2:
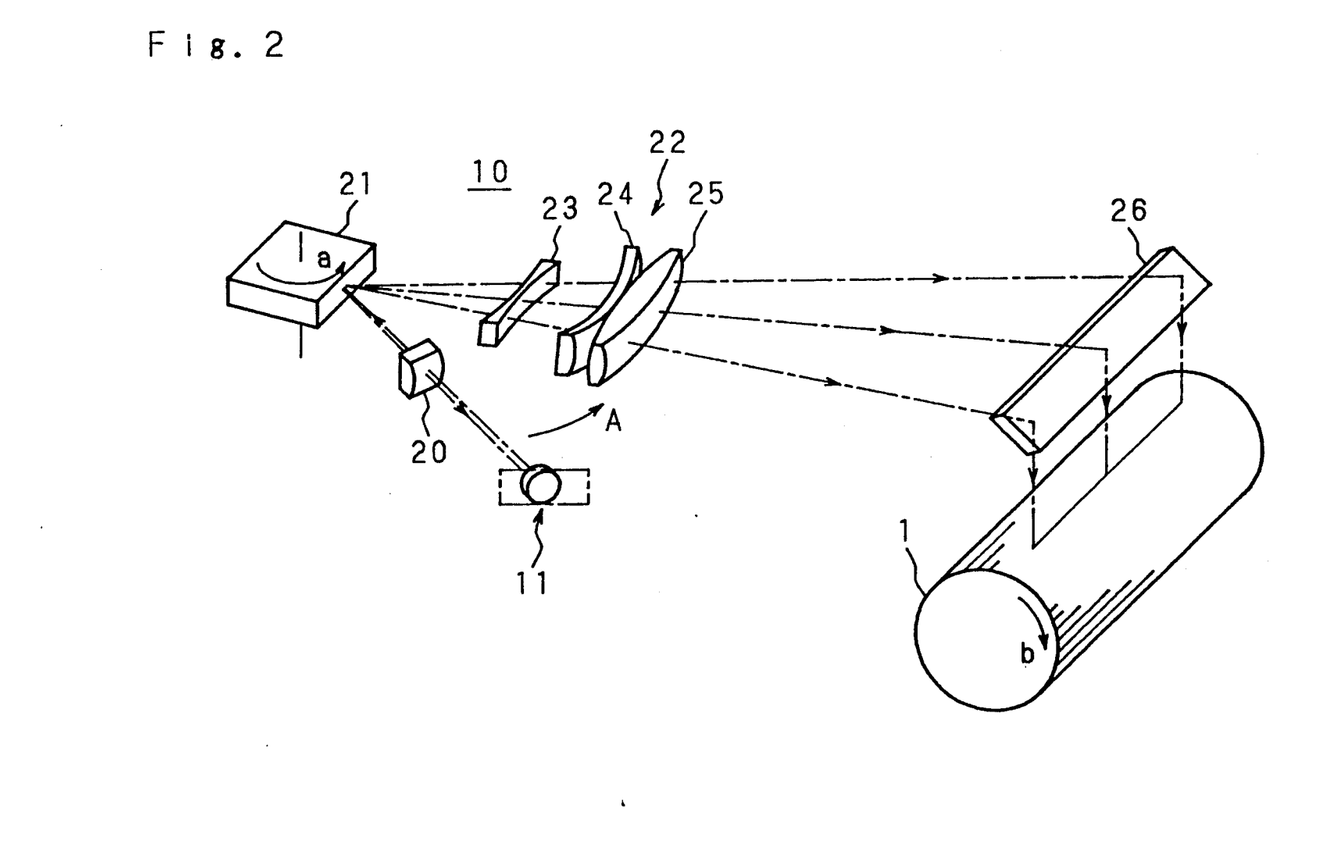
FIG. 2 is a perspective view of disassembled component members and light paths available for composing the laser beam scanning system shown in FIG. 1.

FIGS. 1 and 2 respectively designate a laser beam scanning system 10 according to the first embodiment of the invention. A light source unit 11, a cylindrical lens 20, a polygon mirror 21 having four reflecting surface, an fθ lens 22, and a plane mirror 26, are respectively secured to a housing 40 of the laser beam scanning system 10.

The laser beam emitted from the light source unit 11 initially permeates through the cylindrical lens 20, and then, the laser beam is focused on a point close to the reflecting surface of the polygon mirror 21 in the linear condition coinciding with the deflecting surface of the polygon mirror 21 itself. The polygon mirror 21 is rotated in the arrowed direction "a" at a constant velocity in order to continuously and deflectively scan the laser beam at an equal angular velocity. The scanned laser beam then permeates through the fθ lens 22, and, the laser beam is reflected by the plane mirror 26 before eventually forming a image on a photosensitive drum 1 via a slit 42 of the housing 40. In the meantime, the laser beam is scanned in the axial direction of the photosensitive drum 1 at constant velocity. This is conventionally called the main scanning process. On the other hand, in the event that the laser beam is scanned relative to the rotation of the photosensitive drum 1 in the arrowed direction "b", this operation is conventionally called the sub-scanning process.

Based on those processes described above, an electrostatic latent image is formed on the surface of the photosensitive drum 1 subsequent to the ON-OFF operation of the light source unit 11 and execution of the main and sub scanning processes. The fθ lens 22 is composed of a spherical concave lens 23, a troidal lens 24, and a spherical convex lens 25. The fθ lens 22 corrects distortional astigmatism so that the laser beam can be scanned in the main-scanning direction at equal velocity across the entire scanning range from the center to both ends.

Figure 3:
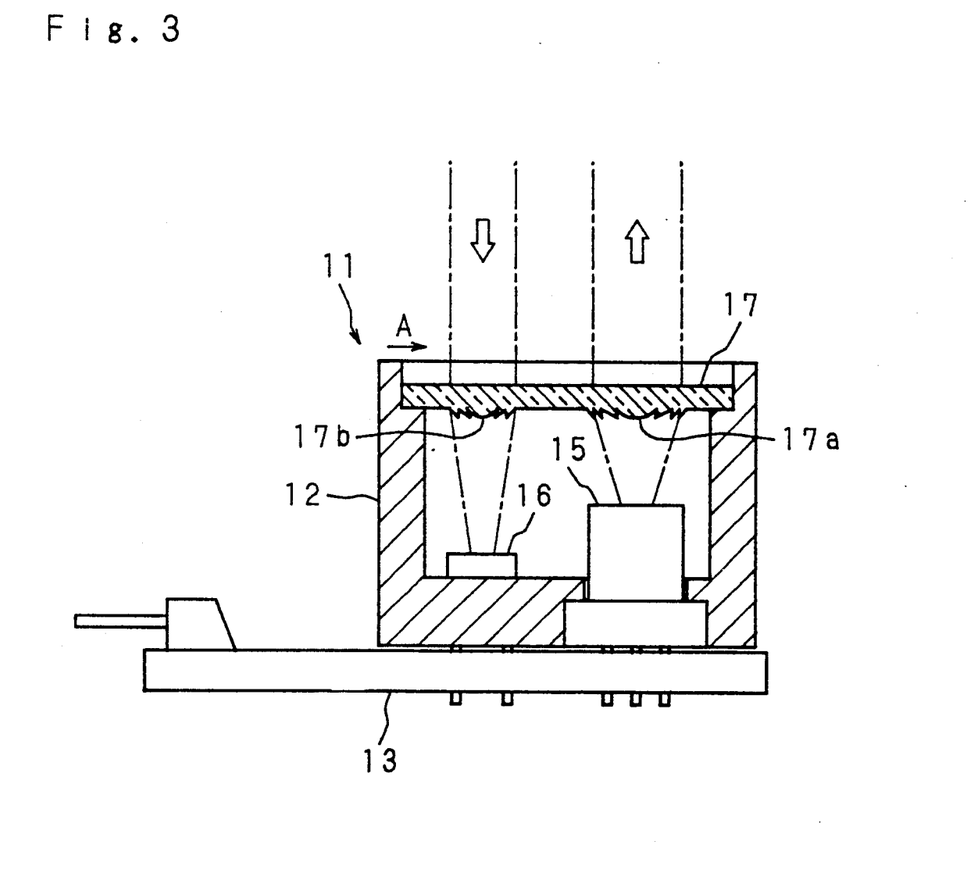
FIG. 3 is a sectional view of a light source unit available for operating the laser beam scanning system according to an embodiment of the invention.

Next, a detail of the light source unit 11 is described below. As shown in FIG. 3, the light source unit 11 has a case 12 incorporating a laser diode 15 and a photodiode 16 (an SOS sensor) available for detecting the image-writing starting point in the state being adjacent to each other. The bottom surface of the case 12 is integrally united with a circuit board 13. A Fresnel lens 17 is provided across the aperture of the case 12. The circuit board 13 incorporates a driving circuit for the laser diode 15 and a detecting circuit for the photosensor 16.

Figure 4:
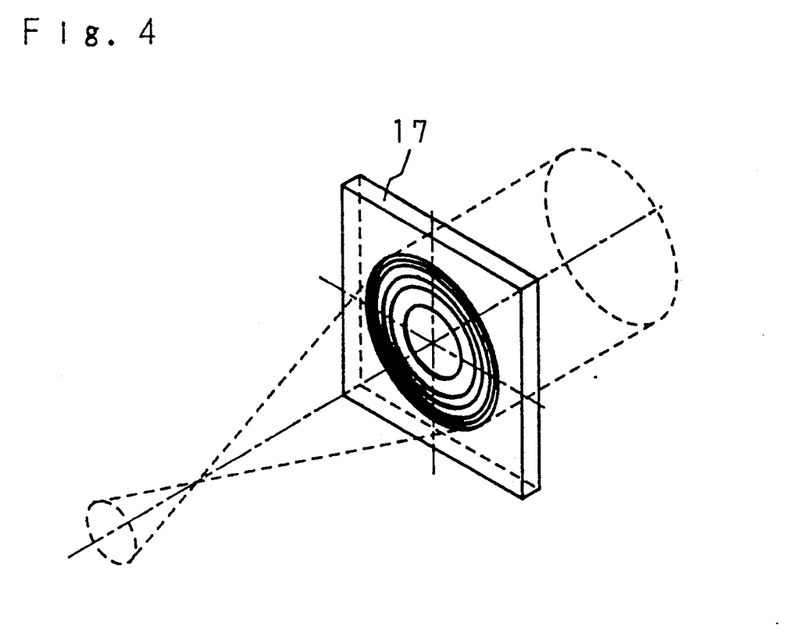
FIG. 4 is a perspective view for explanatory of light condensing operation performed by the Fresnel lens.
Figure 5:
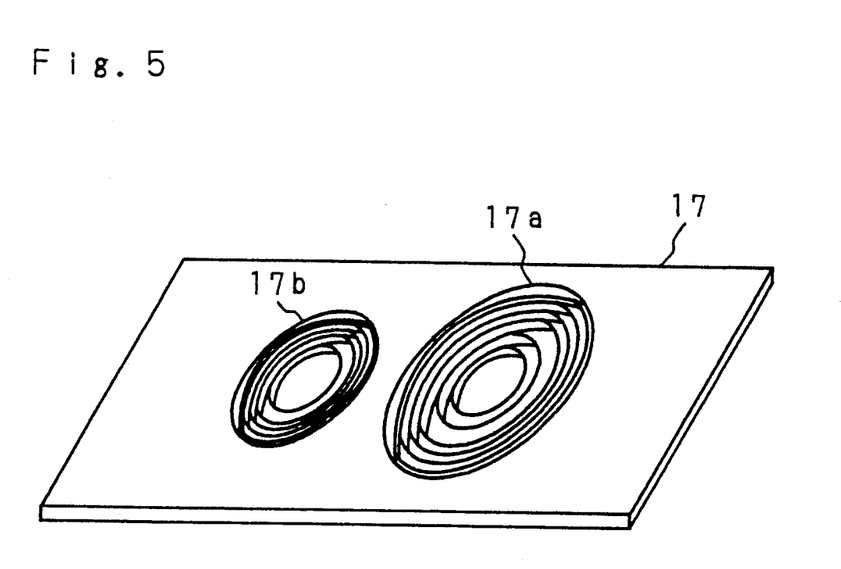
FIG. 5 is a perspective view of a Fresnel lens available for composing the light source unit shown in FIG. 3.

The Fresnel lens 17 comprises a pair of lens parts 17a and 17b. Substantially, these lens parts 17a and 17b are respectively composed of an assembly of concentric-circular patterns based on lattice formation each containing micron-order period and sawtoothed section. Functionally, the Fresnel lens 17 exerts refractive and diffractive effects to cause the laser beam to turn itself at each lattice. When a parallel laser beam is incident on the Fresnel lens 17, the incident beam is converged onto the focal point, and then, a diffusive laser beam radiated from the focal point is turned into a parallel laser beam (as shown in FIG. 4).

The Fresnel lens 17 is made from polycarbonate resin, which is designed to properly deal with laser beam containing 780 nm of wavelength. To properly protect the lattice-formed surface, the Fresnel lens 17 is secured to the case 12 by setting the lattice-formed surface inward.

The beam-emitting element of the laser diode 15 is disposed so that it can precisely be positioned at the focal point of the lens part 17a. This in turn causes the diffusive laser beam emitted from the laser diode 15 to be condensed into the parallel light beam by the lens part 17a, and then, the parallel light beam arrives at the polygon mirror 21 via the cylindrical lens 20.

The photoreceptive surface of the photodiode 16 is disposed so that it can precisely be positioned at the focal point of the lens part 17b. This permits the laser beam permeating through the lens part 17b to form an image on the photoreceptive surface of the photodiode 16.

Figure 6:
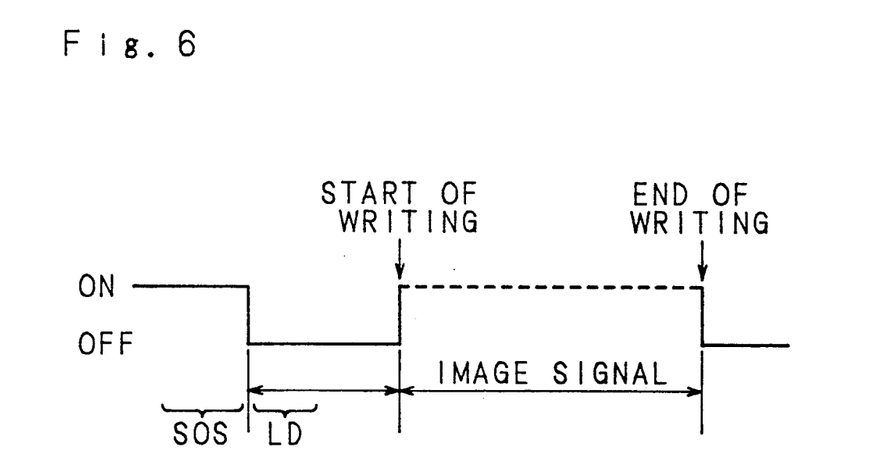
FIG. 6 is a time chart designating ON-OFF operation of the laser diode.

The polygon mirror 21 merely has four reflective surfaces. Immediately after starting a scanning operation, the laser beam is reflected in the direction of the light source unit 11 via the cylindrical lens 20. As shown in FIG. 3, the reflected laser beam shifts itself from the left to the right in the arrowed direction A. Initially, the laser beam irradiates the photodiode 16 via the lens part 17b to activate the photodiode 16 to output SOS detecting signal. Immediately before the reflected laser beam irradiates the laser diode 15, as shown in FIG. 6, the laser diode 15 is turned OFF. Then, the laser diode 15 is again turned ON at the image-writing starting point. Therefore, the laser diode 15 is repeatedly turned ON and OFF in correspondence with image data. Each component element is properly adjusted in order that the image-writing starting point can securely be activated after a predetermined period of time is past from the moment at which the photodiode 16 turns ON.

The light source unit 11 featuring the structure described above uses the Fresnel lens 17 which is provided with thin composition, light weight, and short focal distance. Availing of this advantage, the case 12 compactly houses the laser diode 15 and the photodiode 16. Unlike the conventional laser beam scanning system which normally houses the photodiode in the housing independent of the laser diode, the laser beam scanning system embodied by the invention jointly provides both diodes as a single component part. Furthermore, the Fresnel lens introduced to the laser beam scanning system embodied by the invention can conveniently be produced on the mass-production basis without executing polishing process.

Furthermore, since the photodiode 16 is adjacent to the laser diode 15, the laser beam scanning system embodied by the invention can jointly dispose the driving circuit for the laser diode 15 and the detecting circuit for the photodiode 16 on a single circuit board 13, thus promoting spacewise efficiency of the optical system. Furthermore, unlike the conventional laser beam scanning system which permits external noise to easily infiltrate into harness connecting a pair of circuits, the laser beam scanning system embodied by the invention dispenses with the provision of a harness, and therefore, no noise can actually infiltrate into those adjacent circuits integrally mounted on the circuit board 13.

The laser beam scanning system embodied by the invention initially causes the laser beam reflected by the polygon mirror 21 to irradiate the photodiode 16. When the laser beams reflected by the polygon mirror 21 irradiates the laser diode 15, initially, the laser diode 15 is turned OFF, and thenceforth, the laser diode 15 is repeatedly turned ON and OFF in correspondence with image data while scanning an image on the photosensitive drum 1. This in turn permits the photodiode 16 to securely generate a SOS signal, and yet, securely prevents the problem caused by the incidence of the reflected laser beam on the laser diode 15. On the other hand, if the photodiode 16 were disposed farther from the laser diode 15 on the downstream part of the scanning direction (in other words, the arrowed direction A), then, ON-OFF timing of the laser diode 15 cannot properly be taken. In other words, if ON-OFF timing of the laser diode 15 were accelerated a little, then the reflected laser beam may possibly irradiate the laser diode 15. Conversely, if ON-OFF timing of the laser diode 15 were decelerated a little, then, the laser beam may possibly pass over the photodiode 16 in unstable or OFF condition.

The Second Embodiment

Figure 7:
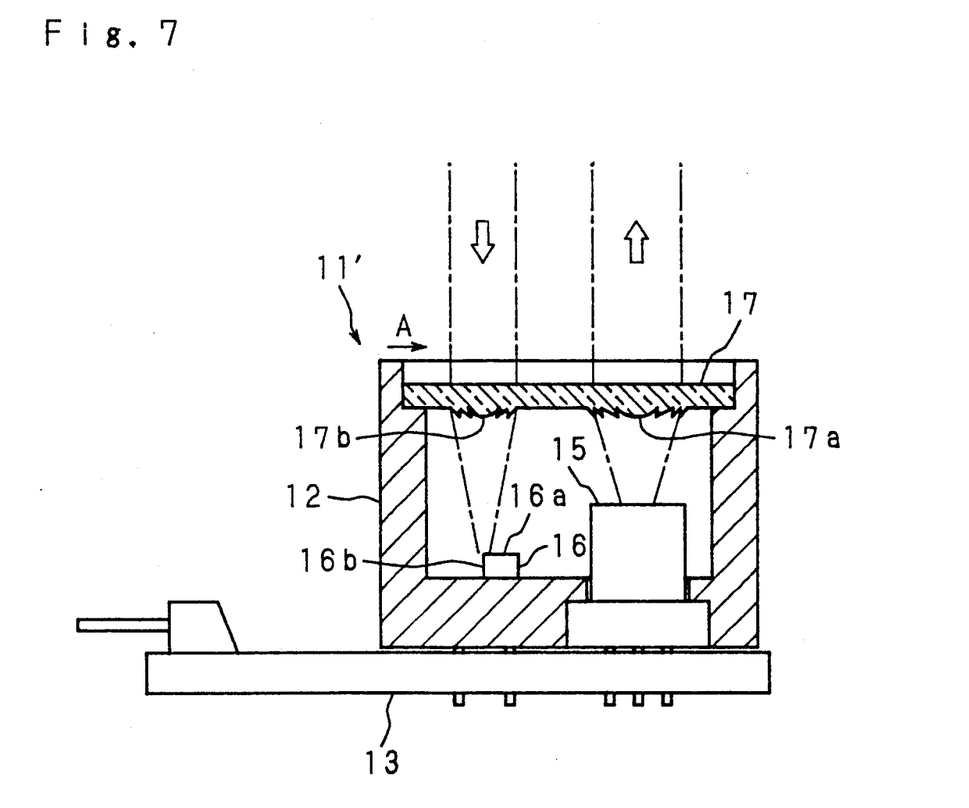
FIG. 7 is a sectional view of another light source unit available for the laser beam scanning system embodied by the invention.

As shown in FIG. 7, the laser beam scanning system according to the second embodiment of the invention disposes an edge 16b of the photoreceptive surface 16a of the photodiode 16 in order that the edge 16b can precisely be positioned at the focal point of the lens part 17b inside of a light source unit 11'. Except for this arrangement, the second embodiment of the invention provides those fundamental structures shown in FIGS. 1, 2, 4 and 5, and the timing shown in FIG. 6 for turning the laser diode 15 ON and OFF, by way of exactly being identical to that is made available for the first embodiment of the invention.

Figure 8A:
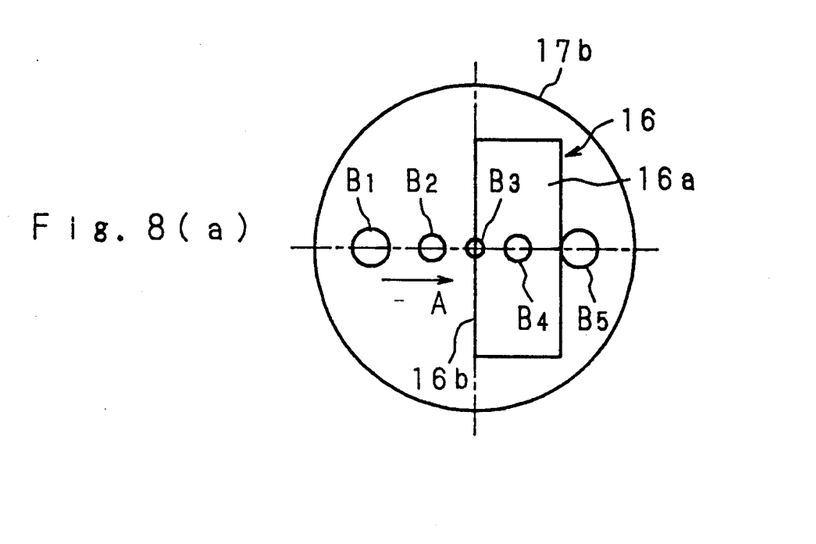
FIG. 8(a) is a pattern chart designating the relationship between the photoreceptive surface of a photodiode, a lens unit, and laser beam available for the embodiment shown in FIG. 7.

According to the second embodiment of the invention, as shown in FIG. 8(a), when the laser beam reflected by the polygon mirror 21 executes a scanning operation in the arrowed direction A, the laser beam condensed by the lens part 17b is sequentially stopped down by the lens part 17b so that the condition B1>B2>B3 can be materialized, where the beam B3 coinciding with the focal point is stopped down to the least. Thenceforth, the laser beam turns to expand itself by way of B3<B4<B5. In consequence, by precisely positioning the edge 16b of the photoreceptive surface 16a at the focal point of the lens part 17b, the least beam B3 is to be incident on the edge 16b of the photoreceptive surface 16a.

Figure 8B:
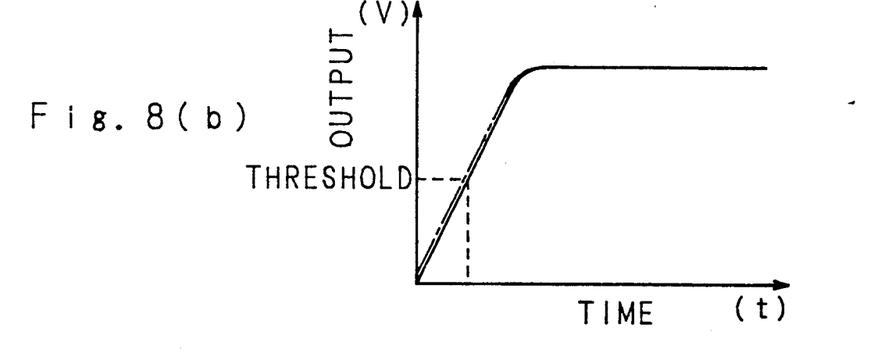
FIG. 8(b) graphically designates output characteristic of the photodiode available for the embodiment shown in FIG. 7.
Figure 8C:
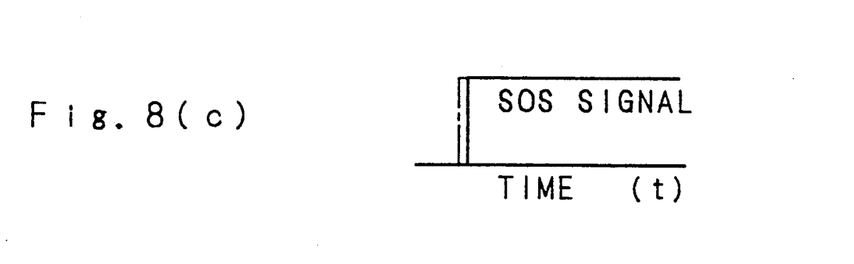
FIG. 8(c) is a chart designating a waveform of a SOS signal available for the embodiment shown in FIG. 7.
Figure 9A:
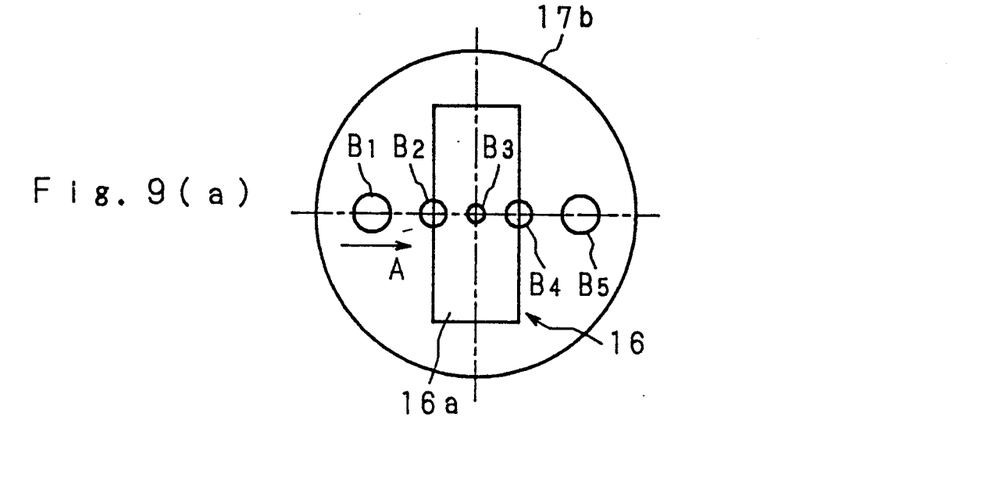
FIG. 9(a) is a pattern chart designating the relationship between the photoreceptive surface of the photodiode, the lens unit, and laser beam, when operating a comparative embodiment of the laser beam scanning system related to the invention.
Figure 9B:
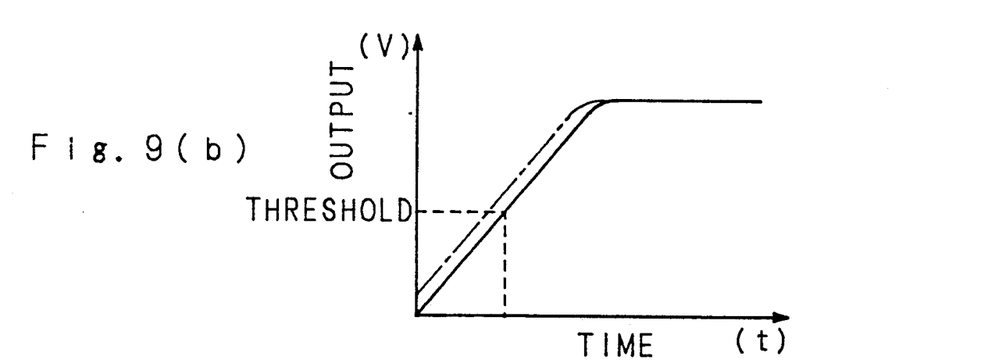
FIG. 9(b) graphically designates an output characteristic of the photodiode available for the comparative embodiment.
Figure 9C:
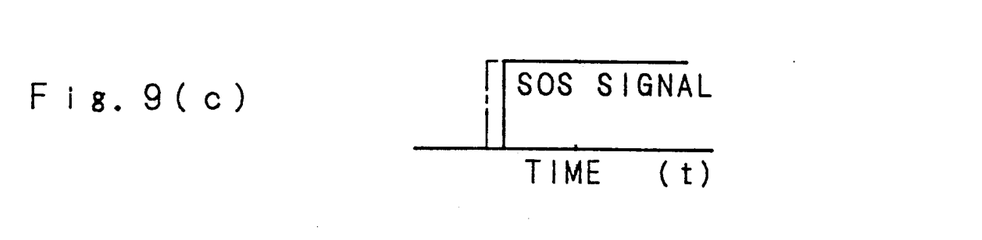
FIG. 9(c) is a chart designating a waveform of a SOS signal available for the comparative embodiment.

FIG. 9(a) shows a comparative embodiment, in which the central portion of the photoreceptive surface 16a is positioned at the focal point of the lens part 17b. FIGS. 8(b) and 9(b) respectively designate magnitude of detecting output from the photodiode 16 relative to those charts shown in FIGS. 8(a) and 9(a). On the other hand, FIGS. 8(c) and 9(c) respectively designate waveforms of a SOS signal relative to those charts shown in FIGS. 8(a) and 9(a).

According to the embodiment of the invention, after receiving the irradiated laser beam B3, the photodiode 16 quickly outputs a detecting signal by accelerating the time to have the detecting output quickly rise up to the threshold value based on improved sensitivity, thus permitting the SOS signal to quickly rise. The dotted chain line shown in FIGS. 8(b), 8(c), 9(b) and 9(c) respectively designates the case in which noise is added to the detecting output from the photodiode 16. It is apparent that, even when noise is added to the detecting output, adverse influence caused by noise can securely be minimized by permitting the stopped-down laser beam to irradiate the edge 16b of the photoreceptive surface 16a of the photodiode 16.

It should expressly be understood that the scope of the laser beam scanning system embodied by the invention is not solely confined to those embodiments described above, but a wide variety of modifications may also be taken into consideration within the scope of Claims that follow.

For example, those embodiments thus far described above have respectively offered a system which causes the light source unit 11 to emit the parallel laser beam before eventually forming an image on the photosensitive drum 1 via the fθ lens 22. Instead, the scope of the invention also permits the light source unit 11 to emit a converged laser beam. In this case, in place of the fθ lens 22, an fθ mirror may also be made available. When emitting the converged laser beam, the beam-emitting element of the laser diode 15 should desirably be installed to a position slightly beyond the focal point of the lens part 17a.

Furthermore, it is not always necessary for the laser beam scanning system of the invention to solely use the Fresnel lens to condense the laser beam, but a glass lens may also be made available for the lens part 17a. Likewise, a cylindrical lens may also be made available for the lens part 17b. Not only the polygon mirror cited above, but a galvano mirror may also be made available for composing a deflecting unit.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A laser beam scanning system used in an image forming apparatus having a photosensitive member on which an image is formed, said laser beam scanning system comprising:
    a laser light source for emitting a laser beam modulated in accordance with the image to be formed;
    a deflecting unit for deflecting the laser beam emitted from said laser light source for scanning;
    a photosensor for receiving the laser beam deflected by said deflecting unit and outputting a signal indicative of the start of scanning to modulate the laser beam;
    a first lens member for converging the laser beam emitted from said laser light source;
    a second lens member for converging the laser beam deflected from said deflecting unit; and
    a supporting means for integrally supporting said laser light source, said photosensor, said first lens member, and said second lens member, said supporting means being unitarily attached to the body of the scanning system, wherein said laser light source and said photosensor are adjacent to each other.

2. A laser beam scanning system as set forth in claim 1, wherein the laser beam deflected by said deflecting unit, reaches said laser light source after irradiating said photosensor during one scanning operation.

3. A laser beam scanning system as set forth in claim 1, wherein said photosensor is disposed at the focal position of said second lens member.

4. A laser beam scanning system as set forth in claim 3, wherein an edge of photoreceptive surface of said photosensor is disposed at the focal position of said second lens member.

5. A laser beam scanning system as set forth in claim 1, wherein said first lens member is a Fresnel lens.

6. A laser beam scanning system as set forth in claim 1, wherein said second lens member is a Fresnel lens.

7. A laser beam scanning system as set forth in claim 1, wherein said first and second lens members are integrally composed in combination with each other.

8. A laser light source unit comprising;
    a laser diode;
    a photosensor;
    a casing for housing said laser diode and said photosensor which are adjacent to each other;

a first lens, secured to a front face of said casing, for converging a laser beam emitted from said laser diode; and a second lens, secured to the front face of said casing, for converging a laser beam to be incident on said photosensor.

9. A laser light source unit as set forth in claim 8, wherein said photosensor is disposed at the focal position of said second lens.

10. A laser light source unit as set forth in claim 9, wherein an edge of photoreceptive surface of said photosensor is disposed at the focal position of said second lens.

11. A laser light source unit as set forth in claim 8, wherein said first lens is a Fresnel lens.

12. A laser light source unit as set forth in claim 8, wherein said second lens is a Fresnel lens.

13. A laser light source unit as set forth in claim 8, wherein said first and second lens are integrally composed in combination with each other.

14. A laser beam scanning system comprising;
a laser light source for emitting a laser beam;
a deflecting unit for deflecting the laser beam emitted from said laser light source for scanning;
a photosensor, disposed on the upstream part farther from said laser light source in the scanning direction of the laser beam deflected by said deflecting unit, for receiving the deflected laser beam and outputting a signal;
a housing means for housing said laser light source and said photosensor; and
a control means for controlling the operation of said laser light source in order to prevent the laser beam deflected by said deflecting unit from being incident on said laser light source after being incident on said photosensor per scanning operation.

15. A laser beam scanning system as set forth in claim 14, further comprising;
a first lens member, installed to said housing means, for converging the laser beam emitted from said laser light source; and
a second lens means, installed to said housing means, for converging the laser beam to be incident on said photosensor.

16. A laser beam scanning system as set forth in claim 15, wherein said photosensor is disposed at the focal position of said second lens member.

17. A laser beam scanning system as set forth in claim 16, wherein an edge of photoreceptive surface of said photosensor is disposed at the focal position of said second lens member.

18. A laser beam scanning system as set forth in claim 15, wherein said first lens member is a Fresnel lens.

19. A laser beam scanning system as set forth in claim 15, wherein said second lens member is a Fresnel lens.

20. A laser beam scanning system as set forth in claim 15, wherein said first and second lens members are integrally composed in combination with each other.

21. An laser beam scanning system as set forth in claim 14, further including a unitary circuit board for mounting said laser light source and said photosensor adjacent to each other.

22. An image forming apparatus comprising:
a photosensitive member;
a laser light source for emitting a laser beam modulated in accordance with an image to be formed;
a deflecting unit deflecting the laser beam emitted from said laser light source for scanning;

a photosensor for receiving the laser beam deflected from said deflecting unit and outputting a signal to determine when to modulate the laser beam with image information;
a first lens member for converging the laser beam emitted from said laser light source;
a second lens member for converging the laser beam deflected by said deflecting unit to said photosensor; and
a supporting means for integrally supporting said laser light source, said photosensor, said first lens member, and said second lens member as a unit attached to said image forming apparatus, wherein said laser light source and said photosensor are adjacent to each other.

23. A laser light source unit used in an image forming apparatus having a photosensitive member on which an image is formed, said laser light source unit comprising:
a laser diode for emitting a laser beam modulated in accordance with the image;
a photosensor for receiving the laser beam and outputting a signal to determine a timing period to begin modulating the laser beam with image information;
a first lens member for converging the laser beam emitted from said laser diode;
a second lens member for converging the laser beam to be incident on said photosensor from said laser diode; and
a casing for supporting said laser diode, said photosensor, said first lens member, and said second lens member integrally as a unit, wherein said laser diode and said photosensor are adjacent to each other, and wherein said casing is mounted on said image forming apparatus.

24. In a laser beam scanning system having a laser source for emitting a laser beam to a deflecting unit for scanning the laser beam across a scanning range and detector means for providing a start of scan signal, the improvement comprising:
means for unitarily mounting the laser beam and detector means in a deflected laser beam path from the deflecting unit before a predetermined scanning range; and
means for controlling the operation of the laser source to prevent the laser beam from being incident on the laser source after being incident on the detector means.

25. A laser beam scanning system as set forth in claim 24, further including a circuit board for jointly mounting the laser source and the detector means.

26. A laser beam scanning system as set forth in claim 25, further including a unitary housing with an opening and a lens member extending across the opening, wherein the laser source and detector means are mounted in the unitary housing and the laser beam extends from and enters through the lens member.

27. A laser beam scanning system as set forth in claim 26 wherein the lens member includes a pair of Fresnel lens components.

28. A laser beam scanning system comprising:
a laser light source for emitting a laser beam;
a deflecting unit for deflecting the laser beam emitted from said laser light source for scanning;
a photosensor with a photoreceptive surface for receiving the laser beam deflected by said deflecting unit and outputting a signal;

a housing means for housing said laser light source and said photosensor which are adjacent to each other;

a first lens member, installed in said housing means, for converging the laser beam emitted from said laser light source; and a second lens means, installed in said housing means, for converging the laser beam to be incident on said photosensor, wherein an edge of said photoreceptive surface of said photosensor is disposed on a focal position of said second lens member.

29. A laser light source unit comprising:

a laser diode;

a photosensor having a photoreceptive surface;

a casing for housing said laser diode and said photosensor which are adjacent to each other;

a first lens, secured to a front face of said casing, for converging a laser beam emitted from said laser diode; and a second lens, secured to the front face of said casing, for converging a laser beam to be incident on said photosensor, wherein an edge of said photoreceptive surface of said photosensor is disposed at a focal position of said second lens.

* * * * *